US 8,000,260 B2

(12) United States Patent
Brady et al.

(10) Patent No.: US 8,000,260 B2
(45) Date of Patent: Aug. 16, 2011

(54) METHOD FOR DYNAMIC INFORMATION TECHNOLOGY INFRASTRUCTURE PROVISIONING

(75) Inventors: John F. Brady, Brooklyn, NY (US); Frank J. DeGilio, Poughkeepsie, NY (US); Sean M. Swehla, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 11/424,887

(22) Filed: Jun. 19, 2006

(65) Prior Publication Data

US 2007/0294736 A1  Dec. 20, 2007

(51) Int. Cl.
*H04L 12/28* (2006.01)
(52) U.S. Cl. ........................................... 370/254
(58) Field of Classification Search .......... 709/220–226; 370/254
See application file for complete search history.

(56) References Cited

U.S. PATENT DOCUMENTS

| | | | | |
|---|---|---|---|---|
| 5,960,175 A | * | 9/1999 | Grossman et al. | 709/222 |
| 6,094,680 A | * | 7/2000 | Hokanson | 709/223 |
| 6,112,243 A | * | 8/2000 | Downs et al. | 709/226 |
| 6,182,139 B1 | * | 1/2001 | Brendel | 709/226 |
| 6,708,209 B1 | * | 3/2004 | Ebata et al. | 709/223 |
| 6,954,464 B2 | * | 10/2005 | Jürgensen et al. | 370/437 |
| 7,483,981 B2 | * | 1/2009 | Weinert et al. | 709/225 |
| 2002/1019458 | | 12/2002 | Suorsa et al. | 717/176 |
| 2004/0117494 A1 | | 6/2004 | Mitchell et al. | 709/230 |
| 2005/0177600 A1 | | 8/2005 | Eilam et al. | 707/104.1 |
| 2005/0188088 A1 | * | 8/2005 | Fellenstein et al. | 709/226 |
| 2005/0198231 A1 | | 9/2005 | Gasca, Jr. et al. | 709/221 |
| 2005/0198244 A1 | | 9/2005 | Eilam et al. | 709/223 |
| 2005/0278760 A1 | * | 12/2005 | Dewar et al. | 725/94 |
| 2008/0216082 A1 | * | 9/2008 | Eilam et al. | 718/104 |

FOREIGN PATENT DOCUMENTS

| WO | WO2005071886 A1 | 8/2005 |
|---|---|---|
| WO | WO2005081137 A1 | 9/2005 |

* cited by examiner

*Primary Examiner* — Derrick W Ferris
*Assistant Examiner* — Mang Yeung
(74) *Attorney, Agent, or Firm* — William A. Kinnaman, Esq.; Kevin P. Radigan, Esq.; Heslin Rothenberg Farley & Mesiti P.C.

(57) ABSTRACT

Provisioning and management resources are drawn from an overall pool of resources. Management and managed resources are then dynamically associated on the network to securely perform requested on-demand management functions. Since the managing system controls the networking between the devices that are managed or provisioned, the linkage of resources incurs a minimal amount of network overhead. Since provisioning resources are themselves dynamically built and automatically associated with the resources being managed, a dramatically reduced management overhead is achieved.

19 Claims, 2 Drawing Sheets

METHOD FOR DYNAMIC INFORMATION TECHNOLOGY INFRASTRUCTURE PROVISIONING

TECHNICAL FIELD

The present invention is generally to computer network-based client/server activities and is more specifically directed to a method for provisioning resources in clustered or grid environments.

BACKGROUND OF THE INVENTION

With the advent of on-demand requirements, Information Technology (IT) organizations are grappling with the provisioning of resources to organizations within the cost limitations set by increasingly budget conscious concerns. The on-demand mode of data processing operation promises resources to users as they are needed. Users expect resources to be available to them in a timely manner and also want to be sure that the information on the resources is secure. In an environment where users are increasingly demanding more and more dedicated resources to specific tasks, the management of multiple resources for various user communities within small deployment windows becomes more difficult.

Many IT organizations still build resources by hand in a time consuming process that is measured in days and weeks rather than minutes and hours. More sophisticated organizations rely on tools that automatically "build machines" that can then be used in a matter of hours but even this can be difficult since the demand drives an ever decreasing time window. As used herein, the reference to "building machines" refers to the activities undertaken in an on-demand data processing environment to identify, assemble, assign and interconnect that environment's machine and software resources used to meet a client's on-demand requests. To deliver on the widely varying and dynamic demands of Information Technology users in a utility computing environment, resources are generally deployed in accordance with the following three principles in mind:

1. Resources are deployed as quickly as possible;
2. Resources are secure, thus ensuring that each user's community's configuration, as well as each user's data, is not available to other user's or user communities.
3. Resources are deployed with as small a management overhead as possible so as to ensure the cost effectiveness of the utility's resources.

These basic principles are the underpinnings of IT optimization in a dynamically built infrastructure.

The state of the art in dynamic construction of IT infrastructure relies on a set of tools each one of which is responsible for building a specific resource or resources. This resource building, commonly referred to as "provisioning," utilizes a number of open standards based technologies that can be interconnected. This interconnectedness allows for the establishment of a hierarchy of tools running on servers in a management system. At the top of the hierarchy, a management server is responsible for telling provisioning servers which resources need to be provisioned. At the next level, a set of tools on a provisioning server is responsible for the actual provisioning of a set of resources.

SUMMARY OF THE INVENTION

The present invention provides a different provisioning paradigm. The provisioning model defined above tightly couples provisioning servers with the resources being provisioned. However, the Dynamic Provisioning model herein views all resources as usable for any applicable function within the infrastructure. This means that management and provisioning resources are no longer permanently dedicated to the resources to which they are associated.

In the present invention, provisioning and management resources are drawn from the overall pool of resources. Management and managed resources are then dynamically associated on the network to securely perform any requested management function. Since the managing system controls the networking between the devices that are managed or provisioned, the linkage of resources incurs a minimal amount of network overhead. Since provisioning resources can themselves be dynamically built and automatically associated with the resources being managed, a dramatically reduced management overhead is achieved. With standard logging and metrics aggregated within the management system, capacity planning makes it a simple task to determine how many provisioning servers are needed at any point in time. Each set of resources is allocated only for the period of time needed to perform the required function. This approach meets all three of the desired criteria set forth above.

1. Resources are deployed quickly Since the solution leverages the automated infrastructure to dynamically associate management and managed resources to perform all of the desired tasks, optimal pairing is achievable. Thus, the choice of management resources can be selected that best suits the number, type and scheduling requirements of the resource being provisioned.
2. Resources are securely provisioned Management resources responsible for the provisioning process are granted exclusive access to an instantiation of the desired aspects of an individual user community's configuration for the duration of the provisioning process. Therefore, configurations are secure before during and after production use. If a set of resources need to be scrubbed after a particular community has used them, these resources are isolated from all user communities and associated with a management resource which performs a "scrubbing" provisioning task.
3. Management resources are optimized Management resources are dynamically deployed to meet demand utilizing a "just in time" provisioning model as opposed to a static assignation, employed in traditional "just in case" or "worst case" provisioning models. Thus the number of dedicated management resources is drastically reduced.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

BEST MODE FOR CARRYING OUT THE INVENTION

Figure 1:
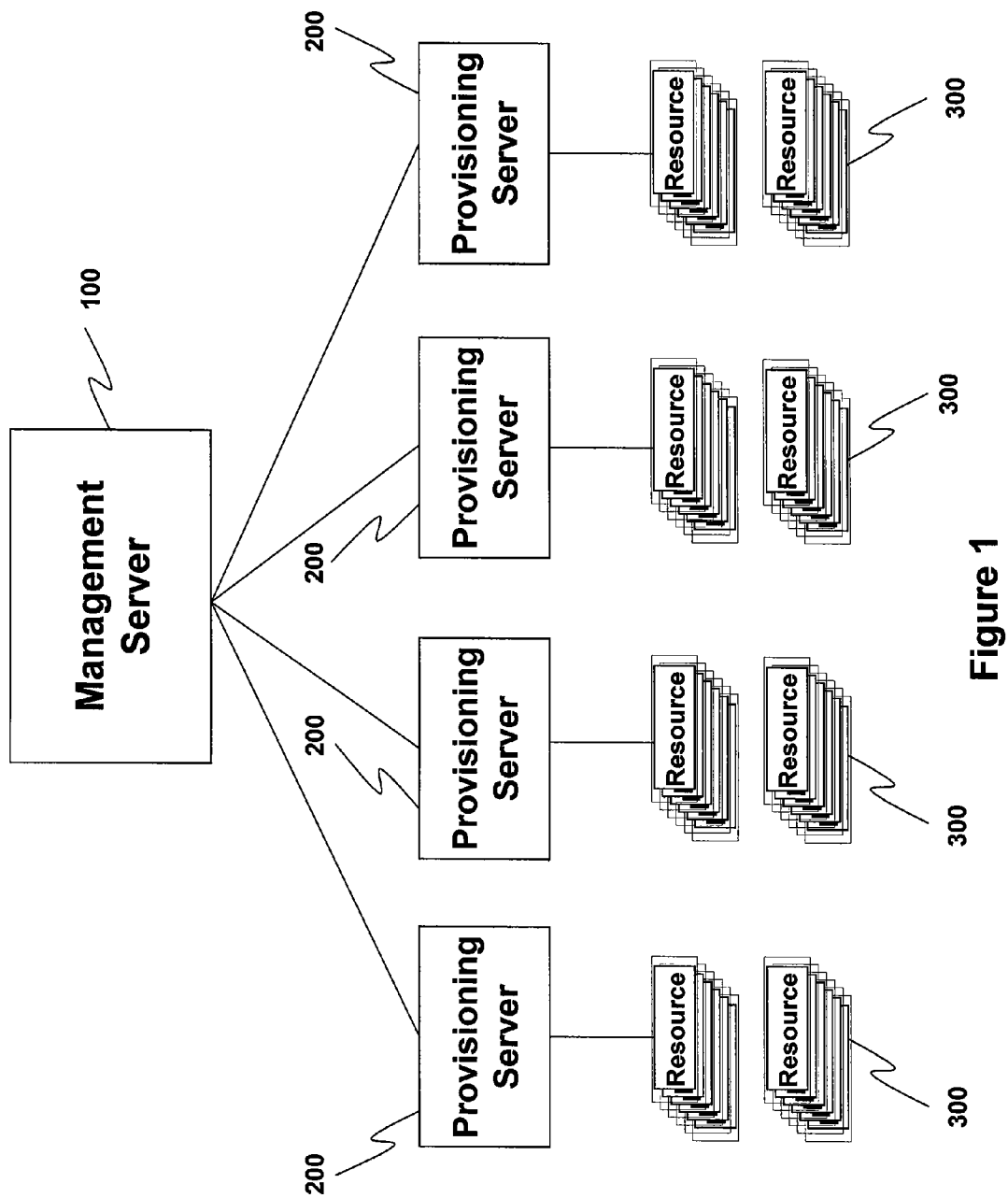
FIG. 1 is a block diagram illustrating conventional provisioning structures.

FIG. 1 describes a relationship between management resources and resources that are being managed. In FIG. 1 management server 100 tells provisioning servers 200 how to provision specific sets of resources 300. Since provisioning server 200 is responsible for a specific set of resources, it has direct control over these resources. This model is effective for controlling a set of resources because the number of resources assigned to a provisioning server is locked to maintain efficiency. Provisioning servers can only manage a certain number of resources effectively. If they attempt to control too many resources, errors in the provisioning process are injected. If too few resources are associated with a provisioning server then all of the assets are not fully utilized. Moreover, the provisioning servers shown in FIG. 1 are dedicated to the job of provisioning only because they have multiple configurations on them and cannot be accessed by user communities. Effectively, these servers are thus very under utilized resources within the on-demand environment. They are necessary to efficiently manage the resources but are unusable in the production environment. Thus, this model effectively adheres to the first two principals by being fast and secure but are somewhat wasteful and do not address the third principle. For most enterprise environments this is not a big issue when the resources managed are somewhat small. However, as the resource pool grows, the management overhead becomes increasingly undesirable. The problem is how to provision the resources in a manner that satisfies all three principles. The present solution leverages virtualization technologies currently available to manage datacenters or datacenter fragments which are logically modeled within the solution.

A management solution to the problem set forth above might, for example, provide one or more of the following management functions:
  (1) A process oriented execution engine that provides a linkage between a modeled data center environment and the real world instantiation of resources within a data center environment.
  (2) A process oriented execution engine, a workflow engine, interactively effects changes to the real time environment.
  (3) A workflow engine that concurrently updates the model to reflect the changes in the physical environment.

The above model contains various resources that are interconnect via virtualized network connections and that are treated as dedicated static management resources to be employed to provision and configure datacenter consumer resources. In this role, these resources are viewed as a logical (if not physical) extension of the consumer resources they provision. This requires more dedicated management resources and implements a solution which does not optimize the resources and is not the most cost effective management of the resources in the enterprise.

One embodiment of the solution provided by the present invention introduces changes in the model set forth immediately above. By redefining many of the heretofore dedicated static management resources as dynamically provisionable resources themselves, a greater level of granularity is applied to the provisioning process. Implementation of this solution involves a more mature and complete data center model. In the conventional model "provisionable" consumer resources are individually defined within homogenous pools and management components are defined as static elements. In the present invention, additional resource pools are created to model and define the elements of the management solution which are dynamically provisioned. Additional modeling enhancements are implemented in the present solution to allow grouped or clustered resources to be managed collectively and provisioned en mass, in contrast to the more commonplace "one at a time" provisioning implementations which are currently typical within many enterprises.

One embodiment of the present invention incorporates a web services Simple Object Access Protocol (SOAP) interface to allow the integration of external management functions such as: an advanced reservation and scheduling subsystem or integration into any other desired management functions and subsystems within an enterprise. The SOAP protocol ensures that an open standard communication flow takes place between the server environments.

Custom processes are implemented within the process of the present invention to facilitate extension of the implementation through integration with external management functions. These custom processes externally invoke the SOAP interface to extend the solution to encompass resources which are newly introduced into the environment. The newly defined resources are then modeled, provisioned and brought into an enterprise wide management schema.

The SOAP interface and the derivative functionally also provide the ability to integrate separate instantiations of the described solution into a single all-encompassing enterprise management schema.

One embodiment of the solution involves and implements certain core technologies. The physical and logical elements which the solution employs and integrates with and manages include the following example. In one embodiment, the solution involves, implements and integrates the following core technologies:
  A functioning TCP/IP needs to be implemented. This network serves as the backbone transport mechanism for implementing the distributed management and provisioning functions.

Action Requests are submitted to the workflow process engine by a number of different methods:
  1. Web Services—SOAP requests are submitted to invoke workflow processes.
  2. Workflow processes are invoked from the Provisioning Manager's Administrative user interface.
  3. Automation routines invoke workflow processes via Web Services—SOAP requests.

Once an action request is submitted to perform provisioning tasks, the master provisioning workflow is invoked. The master provisioning workflow evaluates the provisioning request and validates all of the required data center components against the data center model. If the request is successfully validated and contains only valid resources which are defined within the data center model the action request is processed further. The master provisioning workflow performs calls to sub-process workflows. These sub-process workflows are designed to perform specific provisioning tasks against the individual and collective IT resources and components which are to be provisioned as part of the current request.

The entire provisioning process is ultimately performed by a hierarchy of workflows. The workflows are invoked and monitored by the master provisioning process. The sub-process workflows are designed to interact with the IT resource components in a very atomic fashion, so that the implemented design is ultimately very modular. Individual processes are easily added, updated or removed as the underlying technology evolves and changes within the data center environment. The workflow processes perform provisioning and configuration tasks on IT resources and subsequently update the data center model to reflect the new state of the resources. The various state changes which occur during the provisioning and de-provisioning processes are: available, assigned and in transition.

As IT components are reconfigured by data center staff during the normal course of business operations it is desirable, from time to time, to perform maintenance procedures and to make specific resources unavailable for use by the dynamic provisioning solution. This scenario is supported and workflow processes are invoked by all of the standard methods to move IT resources into "maintenance" mode for the required timeframes and then to return them to available status once all maintenance procedures are completed.

Figure 2:
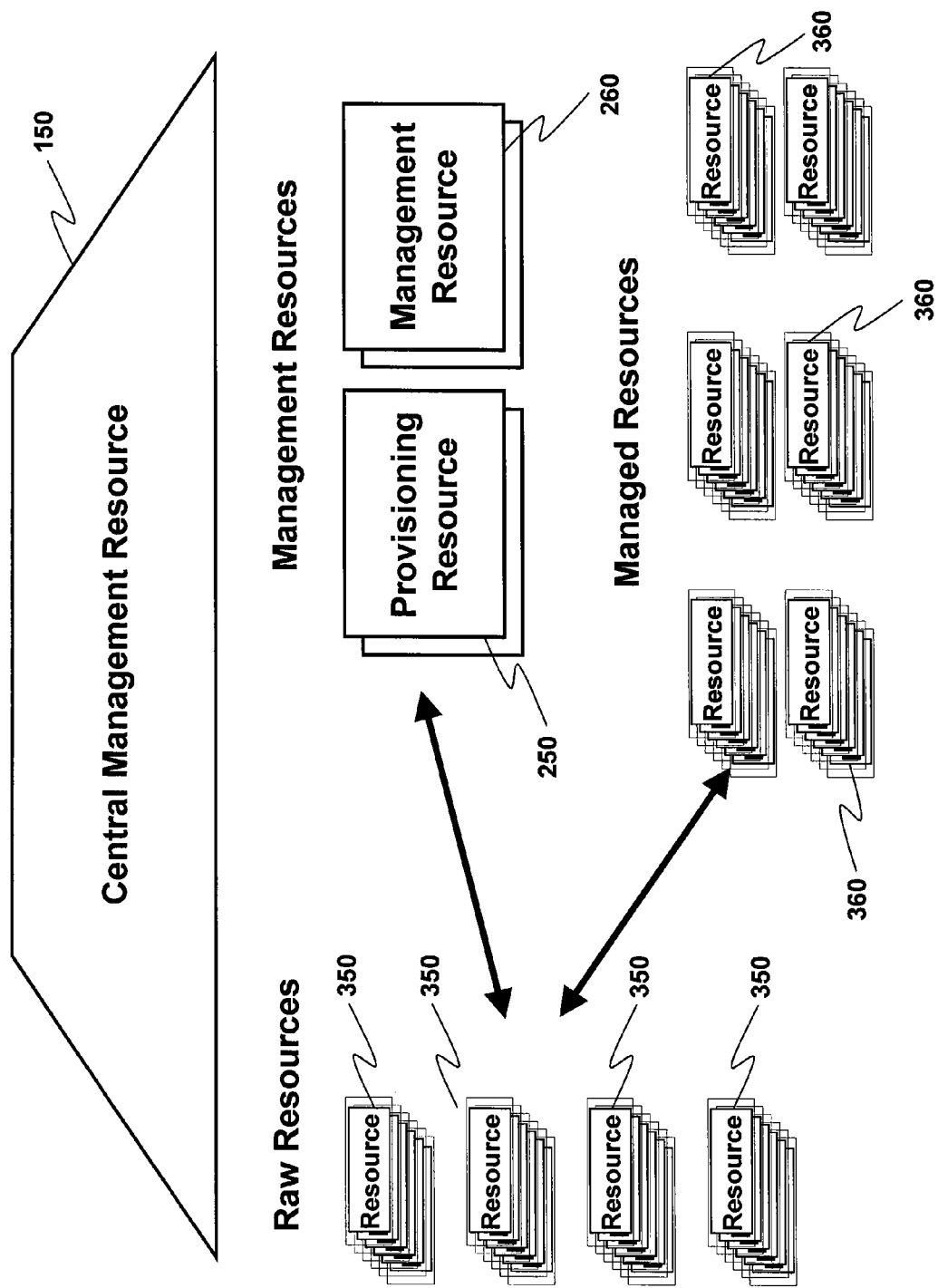
FIG. 2 is a block diagram illustrating the dynamic provisioning structure employed in the present invention.

FIG. 2 illustrates a very different relationship between the management environment and the resources being managed. In the present invention, raw resources 350 are used as either provisioning, management, or managed resources. While there is a small established set of resources in provisioning resource pool 250 and management resource pool 260, the number of servers in this environment varies depending on the need. Thus, when the need to provision servers grows, raw resources 350 are provisioned into provisioning resource pool 250. Once a provisioning server is in provisioning pool 250, other raw resources are pulled from raw pool 350 and provisioned by servers in provisioning pool 250 and moved to managed resource pool 360. Once the need for provisioning is eliminated, resources in provisioning pool 250 are returned to raw resource pool 350 where they can be used as either provisioning resources 250, management resources 260, or managed resourced 360.

Fully configurable Layer2/Layer3 network switching equipment with the ability to implement network controls using abstract commands is desired. The network infrastructure allows a secure environment to be developed which can provide a separate, distinct secure environment for distinct user communities. The solution implements custom processes to reconfigure network settings and to reallocate resources within the network while ensuring that a secure operating environment is maintained.

Pre-boot execution environment (PXE) technology, which allows servers to be booted remotely, with a fully implemented command line API (Application Program Interface) and support for both in-band and out-of-band management of managed server resources, is a very desired element of the present solution. The solution utilizes these management elements to manage and provision consumer resources and to concurrently define these management resources as elements of the solution which are dynamically managed and provisioned as required to meet current demands.

The solution embodiment leverages autonomic theory, allowing a separate service (like Cluster Systems Manager or Xcat) to manage the actual installation and configuration of cluster or grid nodes, since the installation and configuration of nodes is delegated to a service, the management solution focuses on implementing the efficient management of the model. The solution interacts with the switching environment to manage network routing protocols and with the security context to manipulate the build environment and eventual production deployment. Additionally, server management is achieved via secure execution using Lightweight Directory Access Protocol (LDAP) for user management and Secure Shell (SSH) for encrypted access.

The provisioning manager component of the solution is built upon a WebSphere application and utilizes a DB2 database to store the model of the managed environment. By manipulating the model and its real counterparts, the embodiment controls the deployment of provisioning as well as production resources.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of providing on-demand data processing services, said method comprising:

dynamically selecting, by a processor, as a provisioning resource a resource from a pool of raw resources in response to an on-demand provisioning request and placing the provisioning resource in a pool of provisioning resources that build managed resources, wherein building managed resources comprises identifying, assigning and interconnecting one or more resources to meet on-demand provisioning requests, the pool of raw resources including dynamically provisionable resources that are not assigned a particular function in the pool of raw resources but are individually definable as any of (i) a provisioning resource that builds managed resources, (ii) a managed resource that is built by one or more provisioning resources, and (iii) a management resource that instructs the provisioning resources in building the managed resources, wherein defining a resource from the pool of raw resources comprises employing a remote booting capability which facilitates configuring the resource as a provisioning resource, a managed resource, or a management resource;

performing provisioning by the dynamically selected provisioning resource, the performing provisioning building one or more managed resources using one or more other resources from the pool of raw resources and employing the remote booting capability in configuring the one or more resources as the one or more managed resources; and in response to completing the provisioning by the dynamically selected provisioning resource, making the dynamically selected provisioning resource available for another function.

2. The method of claim 1, wherein said making the dynamically selected provisioning resource available for another function comprises returning the dynamically selected provisioning resource to the pool of raw resources to be available as a management resource, a managed resource, or a provisioning resource.

3. The method of claim 2, wherein the making the dynamically selected provisioning resource available for another function further comprises, subsequent to returning the dynamically selected provisioning resource to the pool of raw resources, provisioning the dynamically selected provisioning resource as at least one of a managed resource or a management resource.

4. The method of claim 1, wherein said on-demand provisioning request is provided through a network service protocol.

5. The method of claim 4, wherein said network service protocol is the Simple Object Access Protocol.

6. The method of claim 1, wherein said on-demand data processing services include an advanced reservation capability.

7. The method of claim 1, wherein said on-demand data processing services include an advanced scheduling capability.

8. The method of claim 1, wherein additional resources are defined via a network service protocol.

9. The method of claim 1, wherein the performing provisioning is performed by a plurality of dynamically selected provisioning resources.

10. The method of claim 1, wherein the one or more other resource includes software, and said building comprises installing the software on at least one resource of the one or more other resources.

11. The method of claim 1, wherein one or more raw resources of said pool of raw resources are identified as being in maintenance mode and unavailable for dynamic allocation, and wherein in response to completing maintenance on the one or more raw resources, the one or more raw resources are available for dynamic allocation.

12. The method of claim 1, wherein the dynamically selected provisioning resource is automatically associated with one or more raw resources of the pool of raw resources.

13. A data processing system for providing on-demand services, said system comprising:
   a memory; and
   a processor, in communications with the memory, wherein the data processing system is configured to perform:
      dynamically selecting as a provisioning resource a resource from a pool of raw resources in response to an on-demand provisioning request and placing the provisioning resource in a pool of provisioning resources that build managed resources, wherein building managed resources comprises identifying, assigning and interconnecting one or more resources to meet on-demand provisioning requests, the pool of raw resources including dynamically provisionable resources that are not assigned a particular function in the pool of raw resources but are individually definable as any of (i) a provisioning resource that builds managed resources, (ii) a managed resource that is built by one or more provisioning resources, and (iii) a management resource that instructs the provisioning resources in building the managed resources, wherein defining a resource from the pool of raw resources comprises employing a remote booting capability which facilitates configuring the resource as a provisioning resource, a managed resource, or a management resource;
      the server resource to perform provisioning, the performing provisioning building one or more managed resources using one or more other resources from the pool of raw resources, and employing the remote booting capability in configuring the one or more resources as the one or more managed resources; and
      in response to completing the provisioning by the dynamically selected provisioning resource, making the dynamically selected provisioning resource available for another function.

14. The system of claim 13, wherein said making the dynamically selected provisioning available comprises returning the dynamically selected provisioning resource to the pool of raw resources to be available as a management resource, a managed resource, or a provisioning resource.

15. The method of claim 14, wherein the making the dynamically selected provisioning resource available for another function further comprises, subsequent to returning the dynamically selected provisioning resource to the pool of raw resources, provisioning the dynamically selected provisioning resource as at least one of a managed resource and a management resource.

16. The system of claim 13, wherein the one or more other resources includes software, and said building comprises installing the software on at least one resource of the one or more other resources.

17. The system of claim 13, wherein one or more raw resources of said pool of raw resources are identified as being in maintenance mode and unavailable for dynamic allocation, and wherein in response to completing maintenance on the one or more raw resources, the one or more raw resources are available for dynamic allocation.

18. The system of claim 13, wherein said on-demand provisioning request is provided through a network service protocol.

19. The system of claim 13, wherein said on-demand services include one or more of an advanced reservation capability, an advanced scheduling capability, or a capability for remote booting.

* * * * *